United States Patent [19]
Holmes

[11] Patent Number: 6,039,624
[45] Date of Patent: *Mar. 21, 2000

[54] METHOD FOR ALLOCATING A MOBILE STATION TMSI

[75] Inventor: David William James Holmes, Redmond, Wash.

[73] Assignee: AT&T Wireless Services Inc., Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/688,626

[22] Filed: Jul. 29, 1996

[51] Int. Cl.[7] .................................................. H04Q 7/20
[52] U.S. Cl. ........................... 445/403; 455/518; 455/414
[58] Field of Search .................................... 455/403, 414, 455/422, 432, 435, 433, 458, 550, 551, 518, 519, 456

[56] References Cited

U.S. PATENT DOCUMENTS

| | | |
|---|---|---|
| 3,590,166 | 6/1971 | Anschutz et al. . |
| 4,555,805 | 11/1985 | Talbot . |
| 4,901,340 | 2/1990 | Parker et al. . |
| 4,972,460 | 11/1990 | Sasuta ..................................... 455/432 |
| 5,239,294 | 8/1993 | Flanders et al. . |
| 5,260,987 | 11/1993 | Mauger . |
| 5,278,890 | 1/1994 | Beeson, Jr. et al. . |
| 5,289,179 | 2/1994 | Beeson, Jr. et al. . |
| 5,309,501 | 5/1994 | Kozik et al. . |
| 5,329,573 | 7/1994 | Chang et al. . |
| 5,337,344 | 8/1994 | Alvesalo . |
| 5,375,251 | 12/1994 | Pfundstein . |
| 5,396,543 | 3/1995 | Beeson, Jr. et al. . |
| 5,675,628 | 10/1997 | Hokkanen ............................... 455/433 |
| 5,724,648 | 3/1998 | Shaughnessy et al. .................. 455/519 |
| 5,734,645 | 3/1998 | Raith et al. .......................... 455/466 X |

FOREIGN PATENT DOCUMENTS

| | | |
|---|---|---|
| 0 544 462 | 6/1993 | European Pat. Off. ......... H04Q 7/04 |
| 63-191427A | 8/1988 | Japan . |
| WO 94/21090 | 9/1995 | WIPO . |
| WO 96/04759 | 2/1996 | WIPO ............................. H04Q 7/32 |

*Primary Examiner*—William G. Trost

[57] ABSTRACT

A portion of the bits within an assigned Temporary Mobile Station Identification (TMSI) number are encoded based upon a subscriber's group classifications (i.e., classifications based on the user's characteristics, such as subscriber services and affiliation). When a mobile station user requests service in a visiting location, the user's service profile is accessed to determine the user's group classifications (if any). The mobile station is assigned a TMSI number according to the user's accessed service profile and a portion of bits associated with the TMSI number are encoded based on the identifiable user group classification. The length of the assigned TMSI number may be adjusted depending upon the particular application to maximize the number of TMSI numbers that may be transmitted in a single paging slot.

21 Claims, 2 Drawing Sheets

METHOD FOR ALLOCATING A MOBILE STATION TMSI

BACKGROUND OF THE INVENTION

1. Field of the Invention

The present invention relates in general to telecommunications systems and, more particularly, to a method for allocating a mobile station Temporary Mobile Subscriber Identification (TMSI) number to provide telecommunication services to a particular user group classification.

2. Description of the Related Art

With the increasing popularity of wireless telecommunications systems (e.g., wireless cellular telecommunications systems), telecommunication service providers offer many different types of telecommunication services to their respective customers. Such services are generally provided to users on a subscription basis and, therefore, such users are generally referred to as "subscribers."

To facilitate such services, it is desirable for providers of wireless telecommunications networks to classify mobile stations (e.g., vehicular and portable, hand held cellular telephones and other communication devices) belonging to specific subscribers as an identifiable group for various services, such as sending one page to all members belonging to a specified group classification. In order to do so, it is necessary for the service provider to be able to identify the user associated with a particular mobile station regardless of where that mobile station is within the network and to ascertain whether that particular user subscribes to a specific group classification.

In conventional cellular networks, each mobile station has a unique Mobile Identification Number (MIN) or International Mobile Subscriber Identification number (IMSI) for identification purposes used in billing, record keeping and the like. However, when a mobile station moves outside of its home location served by a Mobile Switching Center (MSC) and enters a visitor location served by another MSC, the mobile station is assigned a Temporary Mobile Subscriber Identification (TMSI) number for identification purposes similar to the MIN or IMSI in network use. A conventional method for generating a TMSI is described, for instance, in U.S. Pat. No. 5,375,251 to Pfundstein. In conventional wireless telecommunications systems, the TMSI number is a unique, often randomly assigned, identification number that is typically 20–24 bits in length. In conventional systems, therefore, the TMSI number is not allocated to more than one user of a given system served by that MSC at one time. Consequently, the TMSI number is usually invalidated when the mobile station crosses into a new location served by a different MSC or after a predetermined period of time following initial allocation of the TMSI number (e.g., 12 hours).

Accordingly, because mobile stations frequently change location within the wireless network and are often controlled by different MSC's, it is problematic for conventional wireless telecommunications systems to effectively identify the user associated with a particular mobile station when the mobile station is outside its home location in order to ascertain whether that particular user subscribes to a specific group classification. In a conventional wireless network, therefore, to page all mobile stations belonging to a particular group of subscribers to answer a call in parallel, it is presently necessary for the calling party to send a separate page to the mobile station corresponding to each member of the group. This procedure, however, has proven to be inconvenient and does not provide sufficient flexibility to take into account the change in locations of mobile stations within the wireless network.

As an alternative to sending a separate page to the mobile station corresponding to each member of the group, a group identification could be preprogrammed into a mobile station to identify the user of that mobile station as a member of a particular group. However, this procedure does not allow the group membership to be dynamically assigned (e.g., as a function of location, time of day, day of week, etc.).

SUMMARY OF THE INVENTION

The above problems are solved and an advance is made over the prior art in accordance with the present invention by allocating a portion of the bits within an assigned mobile station TMSI number for encoding based upon a user's group classifications (i.e., classifications based on the user's characteristics, such as subscriber services and affiliation). When a mobile station user requests service in a visiting location, the user's service profile is accessed to determine the user's group classifications (if any). The mobile station is assigned a TMSI number according to the user's mobile station service profile using the allocated bits. In addition, the length of the assigned TMSI number may be adjusted depending upon the particular application to maximize the number of TMSI numbers that may be transmitted in a single paging slot.

BRIEF DESCRIPTION OF THE DRAWINGS

The foregoing features and other aspects of the invention are explained in the following description taken in connection with the accompanying drawings wherein.

DETAILED DESCRIPTION

Figure 1:
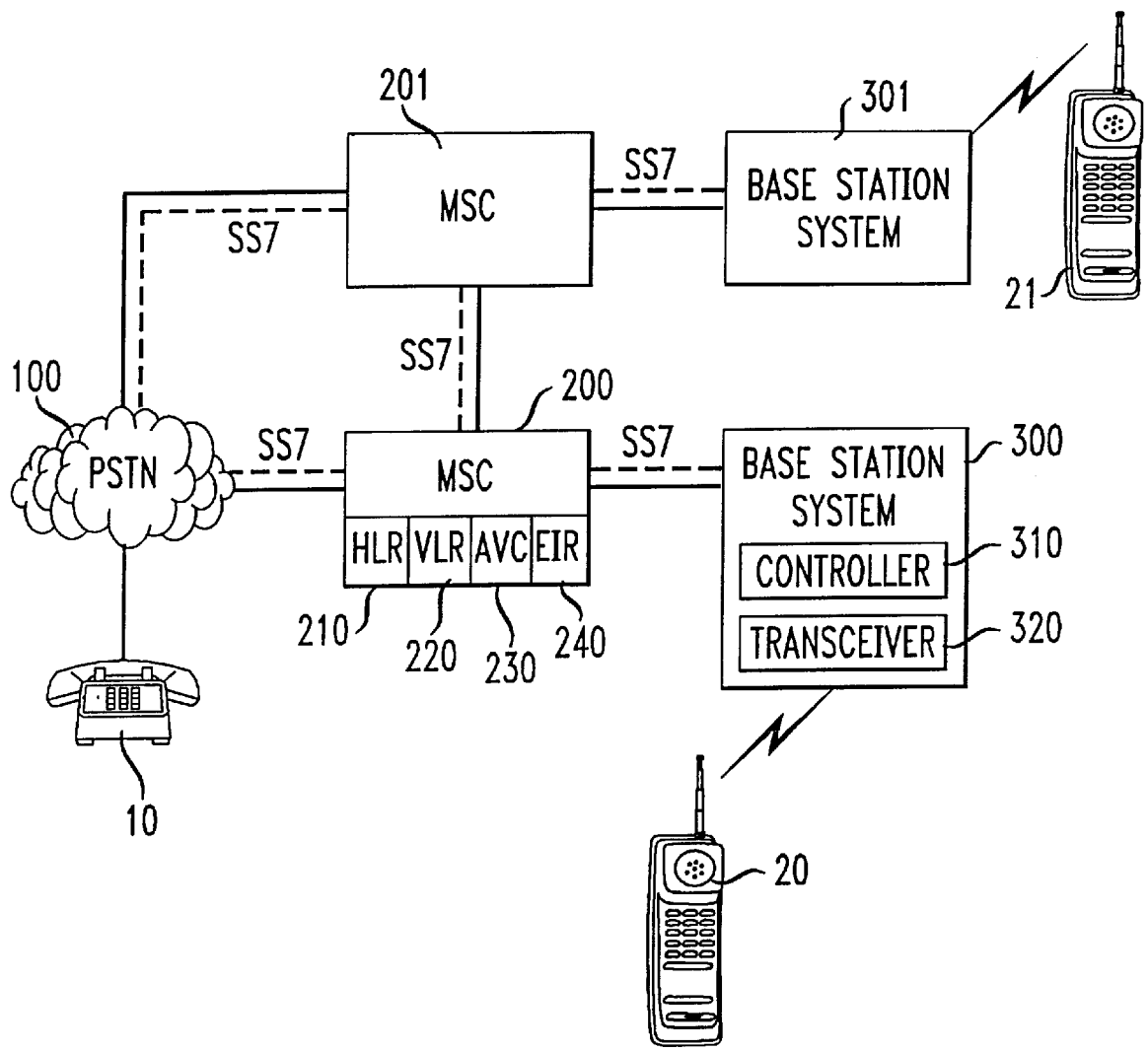
FIG. 1 is a block diagram illustrating the interconnections between a mobile station, a land-based station, a base station system, the public switched telephone network and a mobile switching center.

While it is understood that the present invention is not limited to cellular telecommunications networks, FIG. 1 illustrates a cellular telecommunications system in which the present invention may be utilized. In such a system, conventional cellular technology is applied to allow the same frequencies of a common allocated radio bandwidth to be reused in separated local areas or cells of a broader region.

Generally, each cell is served by a base station system 300 or 301 comprising a group of local transceivers connected to a common antenna. The base station systems 300, 301, each typically comprising a controller 310 and at least one transceiver 320, are interconnected via a switching system, commonly referred to as a mobile switching center (MSC) 200, 201. The MSC 200, 201 is for switching calls involving at least one mobile station 20, 21 and is also connected to the public switched telephone network (PSTN) 100 for communicating with land-based stations 10.

Base station system 300 and mobile station 20 communicate via radio connections. Base station system 300 is also connected via trunks to carry the voice or data, and control messages between mobile station 20 and MSC 200. It is understood that base station system 301 illustrated in FIG. 1 operates in an identical fashion with respect to mobile station 21 and MSC 201.

Wireless telecommunications networks such as that illustrated in FIG. 1 typically comprise many units that need to communicate signaling information for controlling establishment of connections. Such signalling information is typically communicated over channels separate from the channels carrying actual voice or data communications between the customers being connected. Among the units that need to communicate are the mobile stations 20, 21, the base station systems 300, 301 connected by radio to the mobile station 20, 21, the MSC 200, 201 and the various databases that are consulted for the establishment of mobile calls (including the home location register (HLR) 210, the visitor location register (VLR) 220, the authentication center (AUC) 230 and the equipment identity register (EIR) 240). These databases are described below with respect to MSC 200.

Although not illustrated, it is understood that MSC 201 contains separate databases from those of MSC 200 and that MSC 201 operates in an identical manner as MSC 200. In addition, it is understood that HLR 210, AUC 230 and EIR 240 may be separate nodes from the associated MSC and may be directly accessed from other MSC's within the network.

HLR 210 contains data for a mobile customer that is registered in the particular service area of the MSC 200. The data stored in HLR 210 is the permanent data that is independent of the customer's present location within the wireless telecommunications network, plus temporary data such as the addresses of Service Centers that have stored short messages for a mobile station 20. These addresses are erased after the short messages have been delivered. HLR 210 also indicates the Signaling System 7 (SS7) point code used to find a module that contains the VLR 220 currently associated with the mobile station 20.

It is not expected, however, for a subscriber to be constantly in the service area of the same MSC 200 where the subscriber's data is stored (home location). Accordingly, each MSC 200, 201 generally comprises a VLR 220 containing current data for those mobile stations 20, 21 locally registered within the service area of the particular MSC 200, 201, including the customers' mobile station's present or most recently known area, the mobile station's on/off status, and various security parameters.

AUC 230 generally provides authentication and encryption parameters to ensure that a mobile customer cannot falsely assume the identity of another mobile customer and provides data for encryption of the voice or data, and control signals transmitted between the mobile station 20 and the base station system 300.

EIR 240 retains a record of ranges of certified equipment identifications and ranges of or individual equipment identifications which are under observation or barred from service. Equipment identification information is received from the mobile station 20 at the MSC 200 and EIR 240 is used to verify that the equipment number of the mobile station 20 is certified for use in the network and is not on the observation or service barred list.

Figure 2:
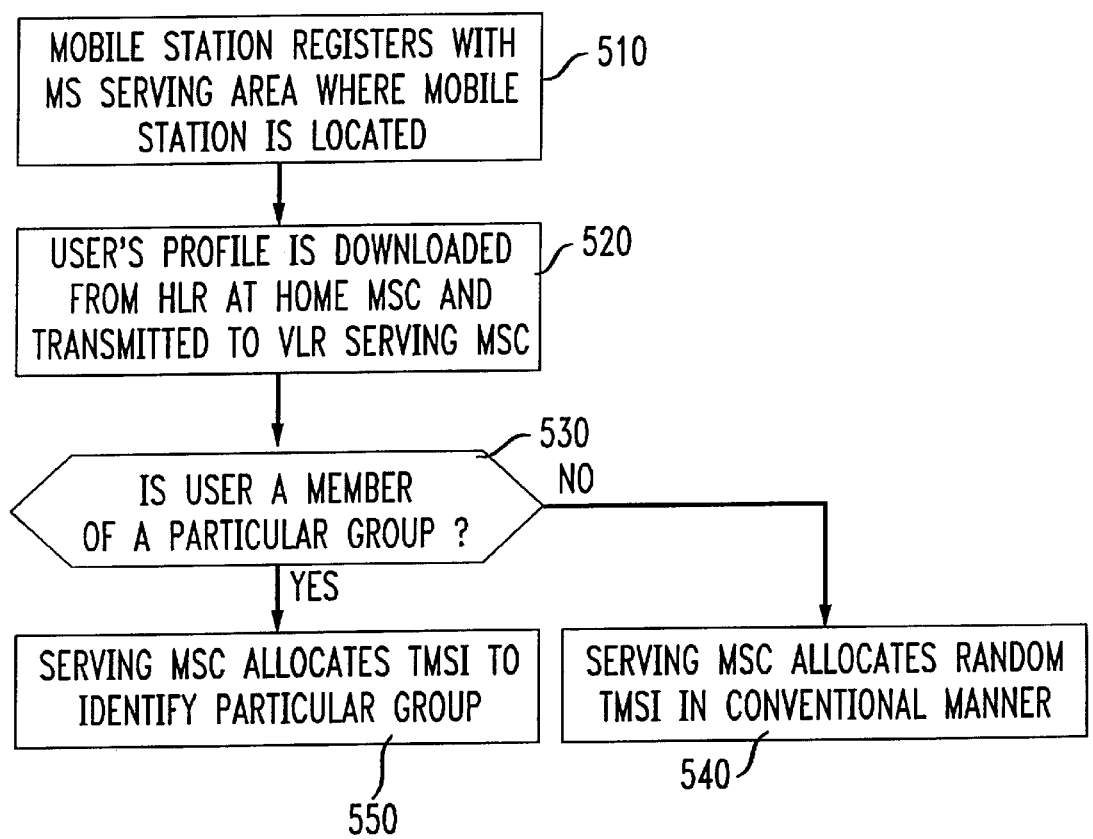
FIG. 2 is a block diagram illustrating the method of allocating a TMSI according to the present invention to identify a group classification associated with a particular mobile station.

In accordance with the present invention, a group of subscribers to cellular services may be classified as an identifiable group so that the network provider may offer group services to each member of the group. With reference to FIG. 2, when a mobile station is first powered up within the cellular network, the mobile station's unique Mobile Identification Number (MIN) or International Mobile Subscriber Identification number (IMSI) is used by the mobile station in a conventional manner to identify and register itself with the MSC serving the area within the network where the mobile station is located (step S10). Such registration is generally accomplished by determining which base station system and associated MSC provides the greatest signal strength to the mobile station. Thus, the mobile station's location area within the cellular network by ascertaining which MSC the mobile station is registered with.

When a call is placed to the mobile station 20, the HLR 210 associated with the home MSC 200 is first accessed and the call may go through conventional authentication processes. The home MSC is the MSC that contains the permanent data concerning the particular mobile station 20 in its HLR 210. Among other things, HLR 210 has stored within it a user profile corresponding to the particular subscriber, which user profile is identifiable based upon the MIN or IMSI number associated with the mobile station 20 registered to the subscriber. The user profile stored in the HLR 210 for each subscriber includes information concerning any group classifications which the subscriber subscribes to.

Thus, based upon the MIN or IMSI number associated with the mobile station being called, the home MSC may look up the user profile for the mobile station being called (step S20). If the mobile station is registered in the service area of its home MSC, then the home MSC looks up the user profile associated with the mobile station being called to readily ascertain if that mobile station has been classified into any group classifications.

Alternatively, when the mobile station 20 is registered in a visitor location with an MSC (serving MSC) other than its home MSC (e.g., mobile station moves outside of the service area of its home MSC and enters a visitor location served by another MSC), the home MSC containing the permanent HLR data for that mobile station identifies the serving MSC in a conventional manner and transmits a copy of the user profile associated with the mobile station to the serving MSC. This user profile is stored in the VLR of the serving MSC.

At this time, the VLR of the serving MSC assigns the mobile station 20 a Temporary Mobile Subscriber Identification (TMSI) number for identification purposes. However, rather than the TMSI number being randomly or pseudo-randomly assigned to temporarily identify the visiting mobile station, the TMSI number is instead allocated in a predefined format to identify any group classifications that the user of the mobile station may subscribe to.

For example, if the TMSI number format is to be 24 bits in length, one or more digits within the TMSI number may be utilized to specify whether the mobile station belongs to a group classification. Accordingly, before assigning the TMSI number, the serving MSC looks up the user profile received and stored in its VLR associated with the mobile station (step S30). If the user profile identifies a group that the mobile station is a member of, then the first digit of the TMSI number assigned by the VLR is set to "0" (step S50). Alternatively, if the mobile station is not a member of a group classification, then the first digit of the TMSI number assigned by the VLR is set to "1" to indicate no group classification and the remainder of the 24 bit TMSI number could be randomly assigned by the VLR (step S40).

Examples of TMSI numbers assigned by the VLR according to the above-mentioned embodiment are recited below:

O A B C T T T T T T 0 0 0 0 0 0 0 0 0 0 0 0 0 0 0 where O=Individual/Group TMSI (0=group ID; 1=individual);

A B=Length of TMSI (e.g., 4/6/10/20 bits); and

C=Broadcast/non-broadcast to identify action to be taken by mobile station when paged.

In accordance with the above-identified TMSI format, the following 24 bit TMSI number could be assigned by the VLR to identify a 6 bit group broadcast TMSI (e.g., passive receipt where information is downloaded to all members of the group and no further action is required):

0 1 0 0 T T T T T T 0 0 0 0 0 0 0 0 0 0 0 0 0 0

Similarly, the following 24 bit TMSI number would identify a 6 bit group non-broadcast TMSI (e.g., active receipt where information is downloaded to all members of the group and further action is required):

0 1 0 0 T T T T T T 0 0 0 0 0 0 0 0 0 0 0 0 0 0

The TMSI numbers allocated in accordance with the present invention are transmitted to the particular mobile station via paging slots within the wireless network. A paging slot is a slot on a digital control channel used for paging mobile stations and is, for example, approximately 100 bits in length as embodied in EIA-TIA Interim Standard 136 (IS-136). Because the number and length of paging slots within the network are limited, it is desirable to efficiently utilize each paging slot. Thus, in accordance with the present invention, a number of short group TMSI numbers may be allocated and economically sent within a single paging slot.

In accordance with the present invention, the length of the assigned TMSI number may be varied upon the particular application. For instance, short group TMSI numbers may be allocated for common, frequently updated broadcast or large dispatch groups, and longer group TMSI numbers could be allocated for small hunt groups. Thus, a single paging slot could effectively carry 3 individual pages and 1 to 5 group TMSI numbers.

To facilitate allocation of differing length TMSI numbers depending upon the particular application, the TMSI number may be assigned in the following format so that the first four digits indicate the type of TMSI number being transmitted:

A P Q R X X X X . . .

where A=Individual/Group TMSI (0=group ID; 1=individual); and PQR=length of the TMSI number. For example, an assigned PQR of 001=(1×20 bits); an assigned PQR of 010=(1×10 bits)+(1×6 bits)+(1×4 bits); . . . an assigned PQR of 111=(5×4 bits).

Although illustrative preferred embodiments have been described herein in detail, it should be noted and will be appreciated by those skilled in the art that numerous variations may be made within the scope of this invention without departing from the principle of this invention and without sacrificing its chief advantages. The terms and expressions have been used herein as terms of description and not terms of limitation. There is no intention to use the terms or expressions to exclude any equivalents of features shown and described or portions thereof and this invention should be defined in accordance with the claims which follow.

I claim:

1. A method for operating a wireless telecommunications network, the network having associated therewith a group of at least one mobile station having an identifiable classification denoting subscriber affiliations or services, the method comprising the steps of:

(a) assigning a temporary identification number to the mobile station belonging to the identifiable classification, the temporary identification number comprising a plurality of bits; and (b) encoding a portion of the plurality of bits based on the identifiable classification.

2. The method according to claim 1, further comprising the step of storing a user profile associated with the mobile station, the user profile identifying any classification assigned to the mobile station.

3. The method according to claim 2, further comprising the steps of:

(a) retrieving the user profile associated with the mobile station; and (b) determining whether the mobile station is assigned to an identifiable classification based upon the retrieved user profile.

4. The method according to claim 3, wherein the user profile is stored within a home location register (HLR) database.

5. The method according to claim 4, further comprising the steps of:

(a) copying the retrieved user profile associated with the mobile station; and (b) transmitting the copied user profile to a mobile switching center servicing the mobile station.

6. The method according to claim 5, wherein the transmitted user profile is stored in a visitor location register (VLR) database associated with the mobile switching center.

7. The method according to claim 3, wherein the user profile associated with the mobile station is retrieved based upon a permanent identification number assigned to the mobile station.

8. The method according to claim 7, wherein the permanent identification number assigned to the mobile station is the mobile station's International Mobile Station Identification (IMSI) number.

9. The method according to claim 7, wherein the permanent identification number assigned to the mobile station is the mobile station's Mobile Identification Number (MIN).

10. The method according to claim 1, wherein at least one bit of the encoded plurality of bits identifies whether the mobile station is assigned to an identifiable classification.

11. The method according to claim 1, wherein the length of the assigned temporary identification number is dependent upon the identifiable classification to efficiently utilize paging slots within the wireless telecommunications network.

12. A method of classifying at least one mobile station within a wireless telecommunications network as an identifiable classification denoting subscriber affiliations or services, comprising the steps of:

(a) storing a user profile associated with the mobile station, the user profile identifying the classification assigned to the mobile station;

(b) assigning a temporary identification number to the mobile station belonging to the identifiable classification, the temporary identification number comprising a plurality of bits; and (c) encoding a portion of the plurality of bits based on the identifiable classification.

13. The method according to claim 12, wherein at least one bit of the encoded plurality of bits identifies whether the mobile station is assigned to an identifiable classification.

14. The method according to claim 12, further comprising the steps of:

(a) retrieving the user profile associated with the mobile station; and (b) determining whether the mobile station is assigned to an identifiable classification based upon the retrieved user profile.

15. The method according to claim 14, wherein the user profile is stored within a home location register (HLR) database.

16. The method according to claim 15, further comprising the steps of:

(a) copying the retrieved user profile associated with the mobile station; and (b) transmitting the copied user profile to a mobile switching center servicing the mobile station.

17. The method according to claim 16, wherein the transmitted user profile is stored in a visitor location register (VLR) database associated with the mobile switching center.

18. The method according to claim 14, wherein the user profile associated with the mobile station is retrieved based upon a permanent identification number assigned to the mobile station.

19. The method according to claim 18, wherein the permanent identification number assigned to the mobile station is the mobile station's International Mobile Station Identification (IMSI) number.

20. The method according to claim 18, wherein the permanent identification number assigned to the mobile station is the mobile station's Mobile Identification Number (MIN).

21. The method according to claim 12, wherein the length of the assigned temporary identification number is dependent upon the identifiable classification to efficiently utilize paging slots within the wireless telecommunications network.

* * * * *